US010014681B2

United States Patent
Duong et al.

(10) Patent No.: US 10,014,681 B2
(45) Date of Patent: Jul. 3, 2018

(54) PROVIDING ELECTRICITY TO ESSENTIAL EQUIPMENT DURING AN EMERGENCY

(71) Applicant: International Business Machines Corporation, Armonk, NY (US)

(72) Inventors: Quang T. Duong, Austin, TX (US); David M. Gordon, Morrisville, NC (US); David L. Schmidt, Cary, NC (US); Scott A. Will, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 14/094,854

(22) Filed: Dec. 3, 2013

(65) Prior Publication Data

US 2015/0155717 A1    Jun. 4, 2015

(51) Int. Cl.
H02J 4/00 (2006.01)
H02H 5/08 (2006.01)
G08B 7/06 (2006.01)
G08B 29/18 (2006.01)

(52) U.S. Cl.
CPC .............. H02H 5/08 (2013.01); G08B 7/066 (2013.01); G08B 29/181 (2013.01)

(58) Field of Classification Search
CPC combination set(s) only.
See application file for complete search history.

(56) References Cited

U.S. PATENT DOCUMENTS

| | | | | |
|---|---|---|---|---|
| 4,130,874 A * | 12/1978 | Pai | ............ | H04Q 9/14 307/31 |
| 4,375,637 A * | 3/1983 | Desjardins | ............. | G08B 29/08 340/10.31 |
| 4,673,920 A * | 6/1987 | Ferguson | ............. | G08B 27/001 340/505 |
| 4,962,473 A * | 10/1990 | Crain | ...................... | G08B 25/14 340/539.2 |
| 5,297,252 A * | 3/1994 | Becker | ................... | G08B 25/14 340/506 |
| 5,619,185 A * | 4/1997 | Ferraro | .............. | G08B 13/1409 340/506 |
| 5,655,561 A * | 8/1997 | Wendel | ................. | G01F 23/243 137/312 |
| 5,696,695 A * | 12/1997 | Ehlers | .................. | G01R 21/133 307/115 |
| 5,936,531 A * | 8/1999 | Powers | .................. | G08B 17/00 169/60 |

(Continued)

FOREIGN PATENT DOCUMENTS

| EP | 1501111 | 1/2005 |
|---|---|---|
| EP | 1236261 | 10/2006 |
| EP | 2143061 | 1/2010 |

*Primary Examiner* — Carlos Ortiz Rodriguez
(74) *Attorney, Agent, or Firm* — Van Leeuwen & Van Leeuwen; Michael P. O'Keefe

(57) ABSTRACT

An approach is provided in which an emergency electrical distribution system detects an environmental alert invoked by an environmental sensor located in a particular location of building structure. The emergency electrical distribution system selects specific electrical source connections in proximity to the environmental sensor and, in turn, terminates electrical power to selected specific electrical source connections.

11 Claims, 8 Drawing Sheets

EMERGENCY MAPPING TABLE 180

| SENSORS | | | ELECTRICAL MAPPING | | | | | | | | |
|---|---|---|---|---|---|---|---|---|---|---|---|
| | | | Zone 1 | | Zone 2 | | Zone 3 | | Zone 4 | | Zone 5 |
| Sensor ID | Zone | Type | Lights | Otlts | Lights | Otlts | Lights | Otlts | Lights | Otlts | Power |
| S1W | 1 | Water | On | OFF | On | OFF | OFF | On | On | On | On |
| S1F | 1 | Fire | On | OFF | On | On | On | On | On | On | On |
| S2W | 2 | Water | On | OFF | On | OFF | On | On | OFF | On | On |
| S2F | 2 | Fire | On | On | On | OFF | On | On | On | On | On |
| S3W | 3 | Water | On | On | On | On | On | OFF | On | OFF | On |
| S3F | 3 | Fire | On | On | On | On | On | OFF | On | On | On |
| S4W | 4 | Water | On | On | On | On | On | OFF | On | OFF | On |
| S4F | 4 | Fire | On | On | On | On | On | On | On | OFF | On |
| S5 | 5 | Any | On | On | On | On | On | On | On | On | On |

(56) References Cited

U.S. PATENT DOCUMENTS

| | | | |
|---|---|---|---|
| 6,281,790 B1* | 8/2001 | Kimmel | G08B 13/19608 340/506 |
| 6,286,106 B1* | 9/2001 | Flannery | G06F 1/30 709/217 |
| 6,323,780 B1* | 11/2001 | Morris | G08B 7/066 340/505 |
| 6,560,991 B1* | 5/2003 | Kotliar | A62C 3/0221 169/45 |
| 6,577,108 B2 | 6/2003 | Hubert et al. | |
| 6,822,555 B2* | 11/2004 | Mansfield, Jr. | G08B 25/06 340/538 |
| 6,995,966 B2* | 2/2006 | Zansky | G08B 17/12 361/103 |
| 7,154,402 B2* | 12/2006 | Dayoub | G08B 17/10 340/628 |
| 7,277,018 B2* | 10/2007 | Reyes | G08B 7/06 340/521 |
| 7,331,426 B2 | 2/2008 | Jahkonen | |
| 7,689,294 B2 | 3/2010 | Morgan et al. | |
| 7,701,087 B2 | 4/2010 | Eckroad et al. | |
| 7,719,415 B2* | 5/2010 | Dahl | G08B 25/14 340/506 |
| 7,852,207 B2* | 12/2010 | Berkman | H04B 3/54 340/538.16 |
| 7,853,417 B2 | 12/2010 | Vaswani et al. | |
| 8,315,744 B2 | 11/2012 | Chatterton et al. | |
| 8,335,595 B2 | 12/2012 | Tolnar et al. | |
| 8,548,630 B2* | 10/2013 | Grohman | B60H 1/00642 700/276 |
| 2001/0047227 A1 | 11/2001 | Baraty | |
| 2005/0225919 A1 | 10/2005 | Combier | |
| 2005/0273183 A1 | 12/2005 | Curt et al. | |
| 2006/0063522 A1* | 3/2006 | McFarland | H04Q 9/00 455/423 |
| 2006/0135339 A1* | 6/2006 | Sandgren | B01D 45/16 494/68 |
| 2006/0265195 A1* | 11/2006 | Woodard | G08B 25/08 702/188 |
| 2007/0090940 A1* | 4/2007 | Roark | H02H 5/00 340/506 |
| 2008/0150360 A1* | 6/2008 | Vezza | G01D 21/00 307/31 |
| 2008/0219239 A1 | 9/2008 | Bell et al. | |
| 2010/0179670 A1 | 7/2010 | Forbes, Jr. et al. | |
| 2011/0175533 A1* | 7/2011 | Holman | E04B 9/32 315/130 |
| 2012/0035778 A1* | 2/2012 | Kong | G06Q 30/018 700/295 |
| 2012/0109340 A1 | 5/2012 | Vezza et al. | |

* cited by examiner

| EMERGENCY MAPPING TABLE 180 ||| ELECTRICAL MAPPING |||||||||
|---|---|---|---|---|---|---|---|---|---|---|---|
| SENSORS ||| Zone 1 || Zone 2 || Zone 3 || Zone 4 || Zone 5 |
| Sensor ID | Zone | Type | Lights | Otlts | Lights | Otlts | Lights | Otlts | Lights | Otlts | Power |
| S1W | 1 | Water | On | OFF | On | OFF | OFF | On | On | On | On |
| S1F | 1 | Fire | On | OFF | On | On | On | On | On | On | On |
| S2W | 2 | Water | On | OFF | On | OFF | On | On | OFF | On | On |
| S2F | 2 | Fire | On | On | On | OFF | On | On | On | On | On |
| S3W | 3 | Water | On | On | On | On | On | OFF | On | OFF | On |
| S3F | 3 | Fire | On | On | On | On | On | OFF | On | On | On |
| S4W | 4 | Water | On | On | On | On | On | OFF | On | OFF | On |
| S4F | 4 | Fire | On | On | On | On | On | On | On | OFF | On |
| S5 | 5 | Any | On | On | On | On | On | On | On | On | On |

FIG. 2

PROVIDING ELECTRICITY TO ESSENTIAL EQUIPMENT DURING AN EMERGENCY

BACKGROUND

The present disclosure relates to providing electricity to essential equipment during an emergency. More particularly, the present disclosure relates to terminating power to specific electrical source connections during an environmental emergency within a building structure.

Environmental emergencies, such as a flood, a fire, smoke, gas leaks, etc., occur in and around buildings. When an environmental emergency occurs in a building, electricity within the entire building is typically turned off and emergency lights are automatically turned on, which are powered by batteries. However, a drawback of turning off power to the entire building is that specific systems within the building are not able to provide assistance during evacuation of the building, such as elevators, automatic locking doors, escalators, phone and intercom systems, and dispatching systems.

BRIEF SUMMARY

According to one embodiment of the present disclosure, an approach is provided in which an emergency electrical distribution system receives an environmental alert invoked by an environmental sensor located in a particular location of building structure. The emergency electrical distribution system selects specific electrical source connections in proximity to the environmental sensor and, in turn, terminates electrical power to selected specific electrical source connections.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 2 is a diagram showing an example of an emergency mapping table that associates environmental alerts to electrical source connections;

DETAILED DESCRIPTION

Figure 1:
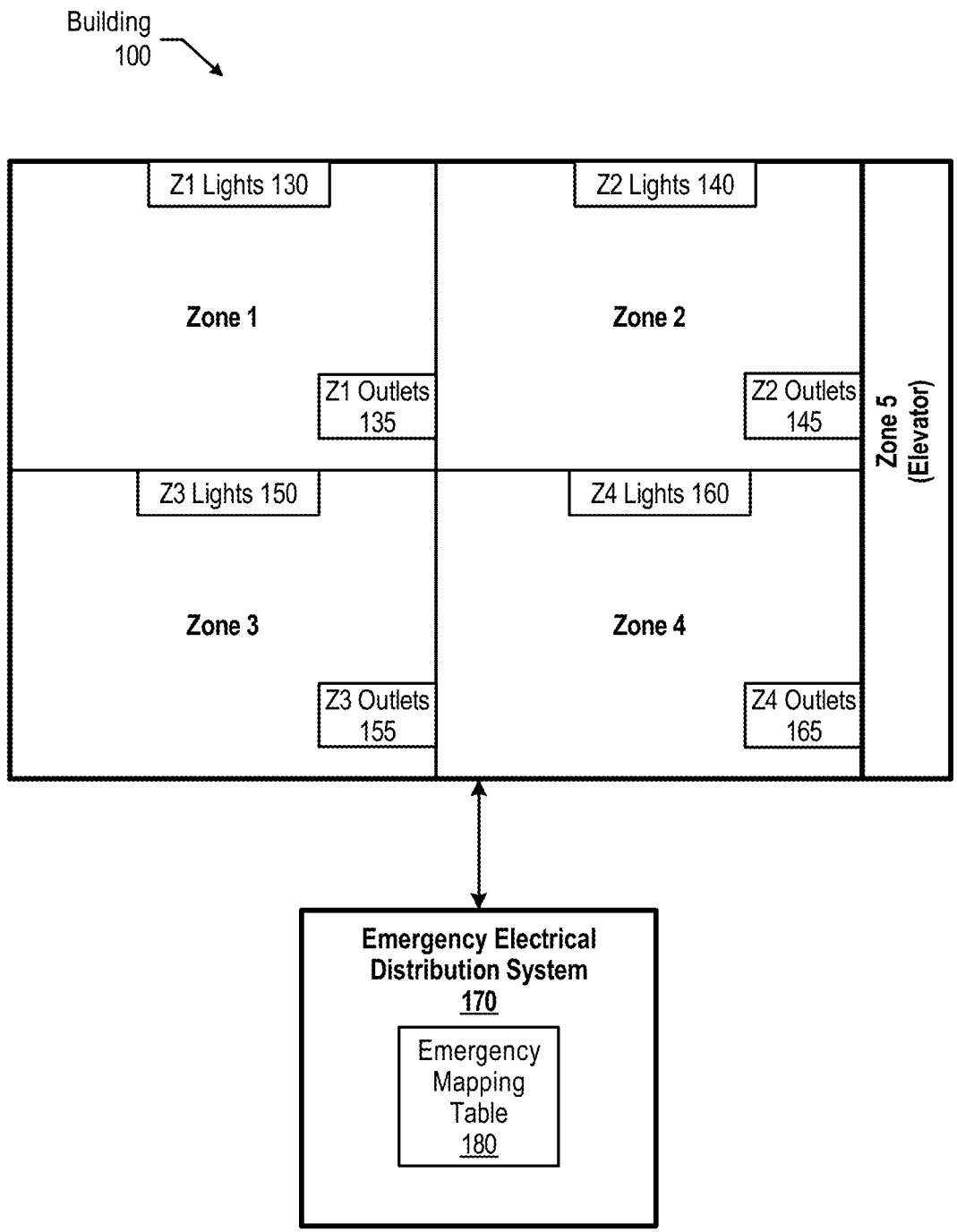
FIG. 1 is a diagram showing one example of an emergency electrical distribution system monitoring multiple zones within a building and selectively terminating power to proximate electrical source connections during an environmental emergency.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 is a diagram showing one example of an emergency electrical distribution system monitoring multiple zones within a building and selectively terminating power to proximate electrical source connections during an environmental emergency. Emergency electrical distribution system 170, in one embodiment, includes an electrical distribution subsystem and an environmental sensor subsystem. In this embodiment, the electrical distribution subsystem provides power to building 100 and the environmental sensor subsystem monitors alerts generated by environmental sensors included in building 100 (e.g., flood sensors, smoke/fire sensors, gas sensors, etc.). In another embodiment, emergency electrical distribution system 170 couples a separate electrical distribution subsystem to a separate environmental sensor subsystem.

Building 100 includes five zones (zones 1, 2, 3, 4, and 5). In one embodiment, each of zones 1-4 are individual rooms and zone 5 is an elevator shaft. Each of zones 1-4 included electrical source connections, which include electrical outlets 135, 145, 155, and 165), light fixture receptacles (130, 140, 150, and 160), and may also include direct wire electrical device connections, such as an electrical connection to a heating system directly wired into wall wiring.

Building 100 includes a variety of environmental sensors installed at a variety of locations. For example, building 100 may have smoke detectors installed towards the ceilings in each of zones 1-5, and may also have flood detectors installed towards the floors in each of zones 1-5.

Figure 5:
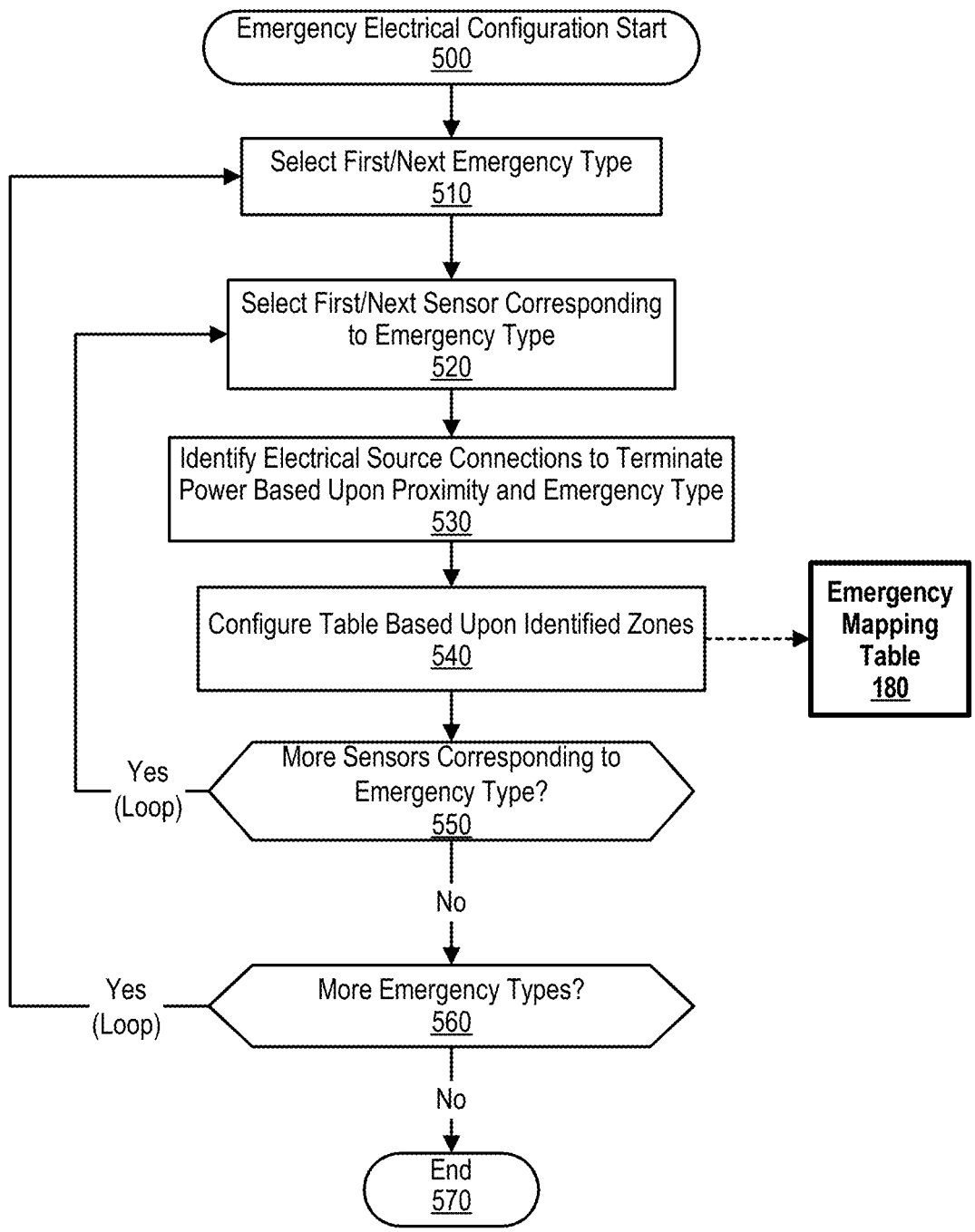
FIG. 5 is a flowchart showing one example of steps taken by an emergency electrical distribution system to configure an emergency mapping table based upon locations of environmental emergencies and types of the environmental emergencies.

In one embodiment, emergency electrical distribution system 170 creates mapping entries in emergency mapping table 180 that map a particular environmental alert to proximate electrical source connections (see FIGS. 2, 5, and corresponding text for further details). As such, emergency electrical distribution system 170 accesses emergency mapping table 180 to match an incoming environmental alert to one of the mapping entries and, in turn, terminate power to specific electrical source connections (while maintaining power to other, non-proximate electrical source connections). For example, when a fire is detected in zone 1, emergency electrical distribution system 170 terminates power to Z1 lights 130 and Z1 outlets 135, but continues to power the remaining electrical source connections in building 100 (see FIG. 3 and corresponding text for further details). As those skilled in the art can appreciate, approaches other than emergency mapping table 180 may be utilized to associate environmental alerts to proximate electrical source connections, such as using a rules engine or a mechanical implementation that triggers particular circuit breakers when a specific environmental alert activates.

FIG. 2 is a diagram showing an example of an emergency mapping table that associates environmental alerts to electrical source connections. The emergency electrical distribution system creates emergency mapping table 180 during configuration steps shown in FIG. 5, which maps electrical source connections to environmental sensors based upon, in one embodiment, the type of sensor and the relative location of the individual electrical source connections to the sensors.

Emergency mapping table 180 includes columns 200-265. As those skilled in the art can appreciate, emergency mapping table 180 may have more, less, or different column types than what is shown in FIG. 2. Columns 200, 210, and 220 include sensor information such as a sensor ID, a zone location, and a sensor type. Columns 225 through 265 include, for each mapping entry, a subset of proximate electrical source connections to terminate power when emergency electrical distribution system 170 receives an alert for a particular sensor. In one embodiment, each subset is a "proper subset," which excludes a portion of the electrical source connections from being terminated.

Figure 3:
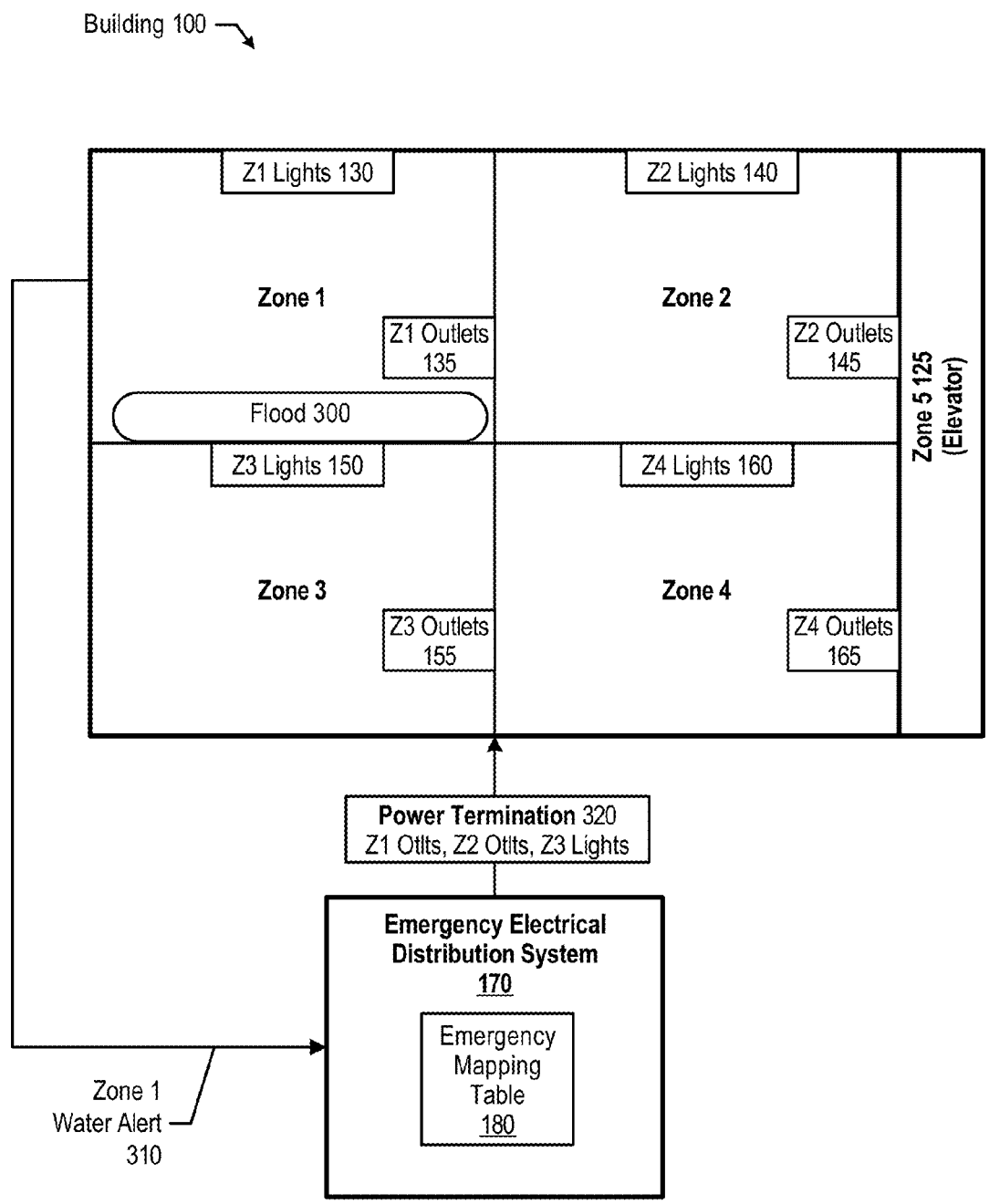
FIG. 3 is a diagram showing an emergency electrical distribution system detecting a flood in a particular zone of a building.

Row 270 shows that when zone 1's water sensor activates, emergency electrical distribution system 170 should terminate power to zone 1 outlets, zone 2 outlets, and zone 3 lights (due to the risk of water dripping from zone 1's floor to zone 3's ceiling, see FIG. 3 and corresponding text for further details). Likewise, row 280 shows that when zone 4's fire alert activates, emergency electrical distribution system 170 should terminate power to zone 4's outlets (see FIG. 4 and corresponding text for further details).

FIG. 3 is a diagram showing emergency electrical distribution system 170 detecting a flood in a particular zone of building 100. Emergency electrical distribution system 170 receives zone 1 water alert 310, which is triggered by flood 300 (e.g., a broken water pipe, running sink, etc.). Emergency electrical distribution system 170 accesses emergency mapping table 180 and identifies a mapping entry that matches zone 1 water alert 310.

Referring to FIG. 2, mapping entry 270 matches zone 1 water alert 310, which indicates termination of power to zone 1 outlets, zone 2 outlets, and zone 3 lights (water may drip from Zone 1's floor to Zone 3's ceiling). In turn, emergency electrical distribution system 170 performs power termination 320, which terminates power to the three electrical source connections. In one embodiment, power termination 320 is an action of emergency electrical distribution system 170 terminating power to the identified electrical source connections. In another embodiment, power termination 320 may be a message sent from emergency electrical distribution system 170 to an external electrical distribution subsystem to terminate power to the identified electrical source connections.

Figure 4:
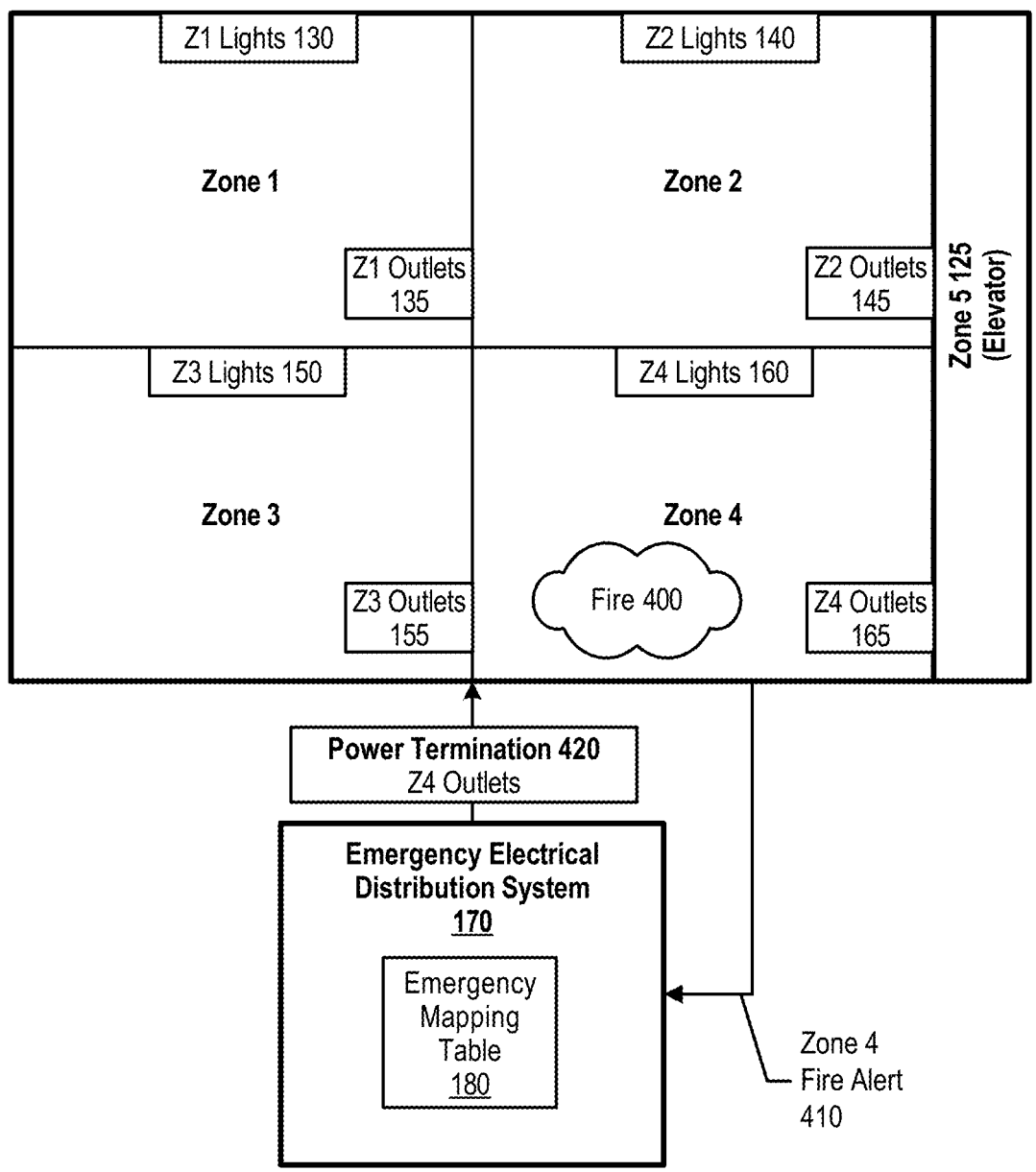
FIG. 4 is a diagram showing an emergency electrical distribution system detecting a fire in a particular zone of a building.

FIG. 4 is a diagram showing emergency electrical distribution system 170 detecting a fire in a particular zone of building 100. Emergency electrical distribution system 170 receives zone 4 fire alert 410, which is triggered by fire 400. Emergency electrical distribution system 170 accesses emergency mapping table 180 and identifies a mapping entry that matches zone 4 fire alert 410.

Referring to FIG. 2, mapping entry 280 matches zone 4 fire alert 410, which indicates terminating power to zone 4 outlets 165. In turn, emergency electrical distribution system 170 performs power termination 420, which terminates power to zone 4's outlets 165. In one embodiment, power termination 420 is an action of emergency electrical distribution system 170 terminating power to the identified electrical source connection. In another embodiment, power termination 420 may be a message sent from emergency electrical distribution system 170 to an external electrical distribution subsystem to terminate power to the identified electrical source connection.

FIG. 5 is a flowchart showing one example of steps taken by an emergency electrical distribution system to configure an emergency mapping table based upon locations of environmental emergencies and types of the environmental emergencies.

Processing commences at 500, whereupon the emergency electrical distribution system selects a first emergency type at 510, such as "Fire." At step 520, the emergency electrical distribution system selects a first sensor corresponding to the selected emergency type, such as "smoke alarm 1." The emergency electrical distribution system, at 530, identifies electrical source connections (lights/power outlets) in proximity to the selected sensor to terminate power when the selected sensor activates an alert (subset of proximate electrical source connections). For example, the emergency electrical distribution system may identify electrical outlets and lights in a room that includes the selected sensor, and may also identify electrical outlets and/or electrical outlets in an adjacent room (see FIGS. 3, 4, and corresponding text for further details).

At 540, the emergency electrical distribution system configures emergency mapping table 180 based upon the electrical source connections identified at 530. Referring to the embodiment shown in FIG. 2, each mapping entry may include a sensor identifier, a zone identifier, an emergency type, and identifiers that identify which electrical source connections to terminate power when a particular sensor activates.

A determination is made as to whether there are more sensors of the selected emergency type (e.g., more smoke alarms). If there are more sensors for the selected emergency type, decision 550 branches to the "Yes" branch, whereupon the emergency electrical distribution system selects the next sensor and generates a mapping entry in emergency mapping table 180 accordingly. This looping continues until the emergency electrical distribution system has processed each sensor corresponding to the selected emergency type, at which point decision 550 branches to the "No" branch.

A determination is made as to whether there are more emergency types to select, such as a flood sensor, a gas leak sensor, etc. (decision 560). If there are more emergency types to select, decision 560 branches to the "Yes" branch, which loops back to select and process sensors corresponding to the next sensor type. This looping continues until there are no more emergency types to process, at which point decision 560 branches to the "No" branch, whereupon table configuration processing ends at 570.

Figure 6:
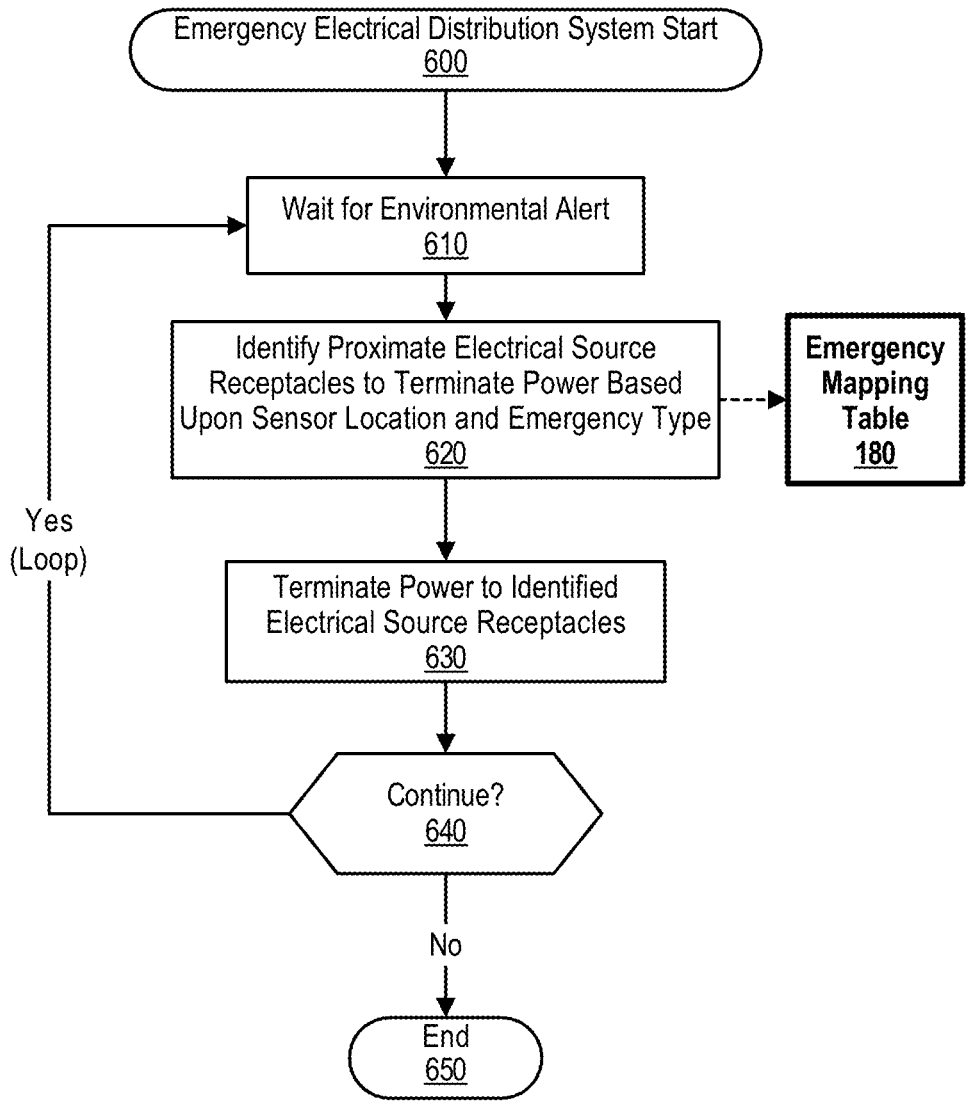
FIG. 6 is a flowchart showing an example of steps taken by an emergency electrical distribution system to terminate power to a subset of electrical source connections based upon an environmental alert.

FIG. 6 is a flowchart showing an example of steps taken by an emergency electrical distribution system to terminate power to a subset of electrical source connections based upon an environmental alert. Emergency electrical distribution system processing commences at 600, whereupon the emergency electrical distribution system waits for an environmental alert at 610, such as a fire alert or a flood alert.

When the emergency electrical distribution system receives an environmental alert, the emergency electrical distribution system matches the environmental alert to an mapping entry in emergency mapping table 180. The emergency electrical distribution system, in turn, identifies proximate electrical source connections identified in the matched mapping entry to terminate power (620). At 630, the emergency electrical distribution system terminates power to the proximate electrical source connections, such as terminating power to electrical outlets within a room having the environmental emergency and terminating power to a ceiling light below the room (see FIGS. 3, 4, and corresponding text for further details).

A determination is made as to whether the emergency electrical distribution system should continue to wait for environmental alerts (decision 640). For example, a flood or fire may spread to other zones, thus activating other sensors and requiring the emergency electrical distribution system to terminate power to other electrical connections in a building structure. If the emergency electrical distribution system should continue monitoring environmental alerts, decision 640 branches to the "Yes" branch, which loops back to wait for the next environmental alert. This looping continues until the emergency electrical distribution system should terminate sensor monitoring (e.g., the emergency is over and power is turned off to the building structure), at which point decision 640 branches to the "No" branch, whereupon emergency electrical distribution system processing ends at 650.

Figure 7:
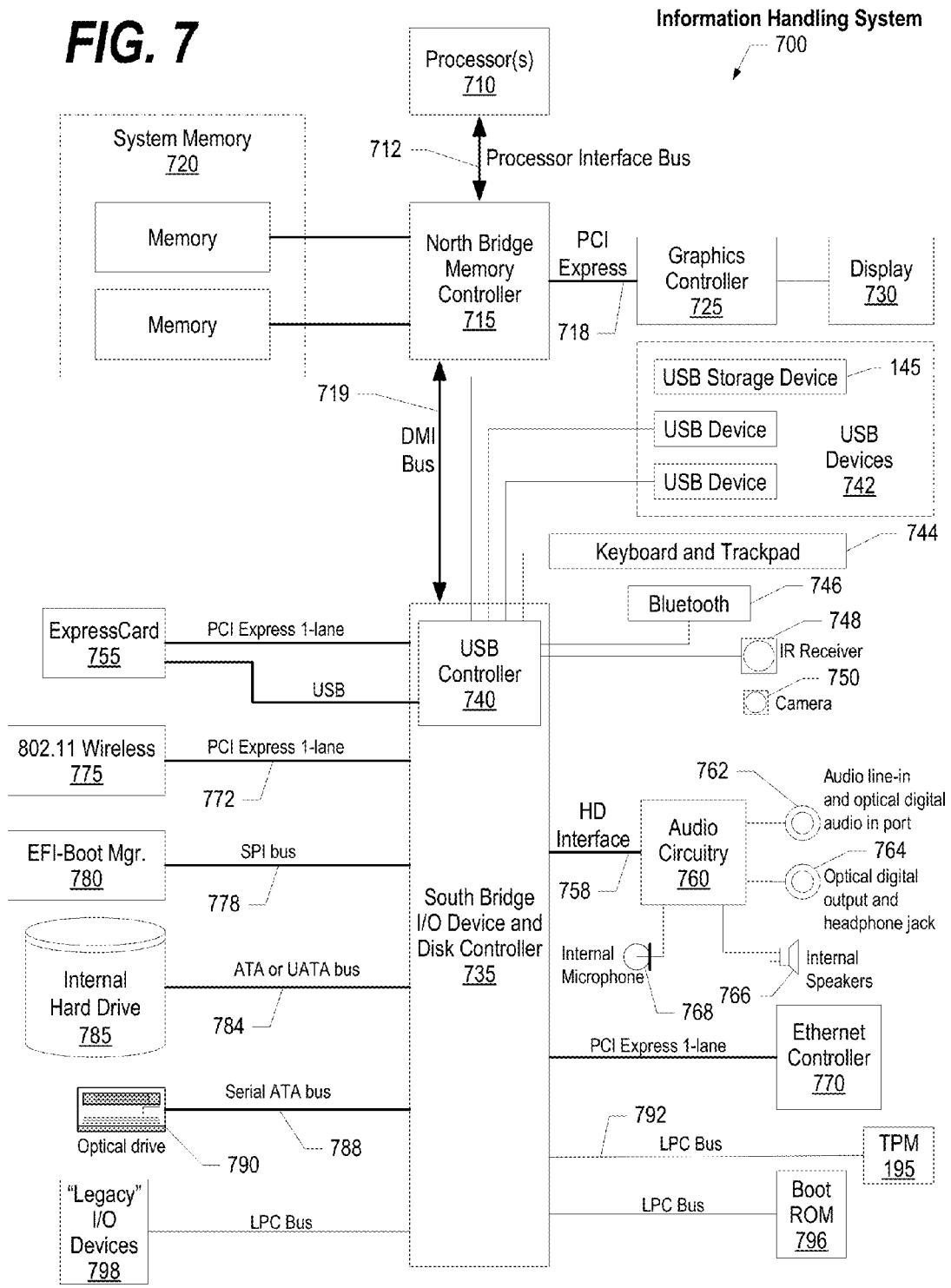
FIG. 7 is a block diagram of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 795) shown in FIG. 7 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 8.

Figure 8:
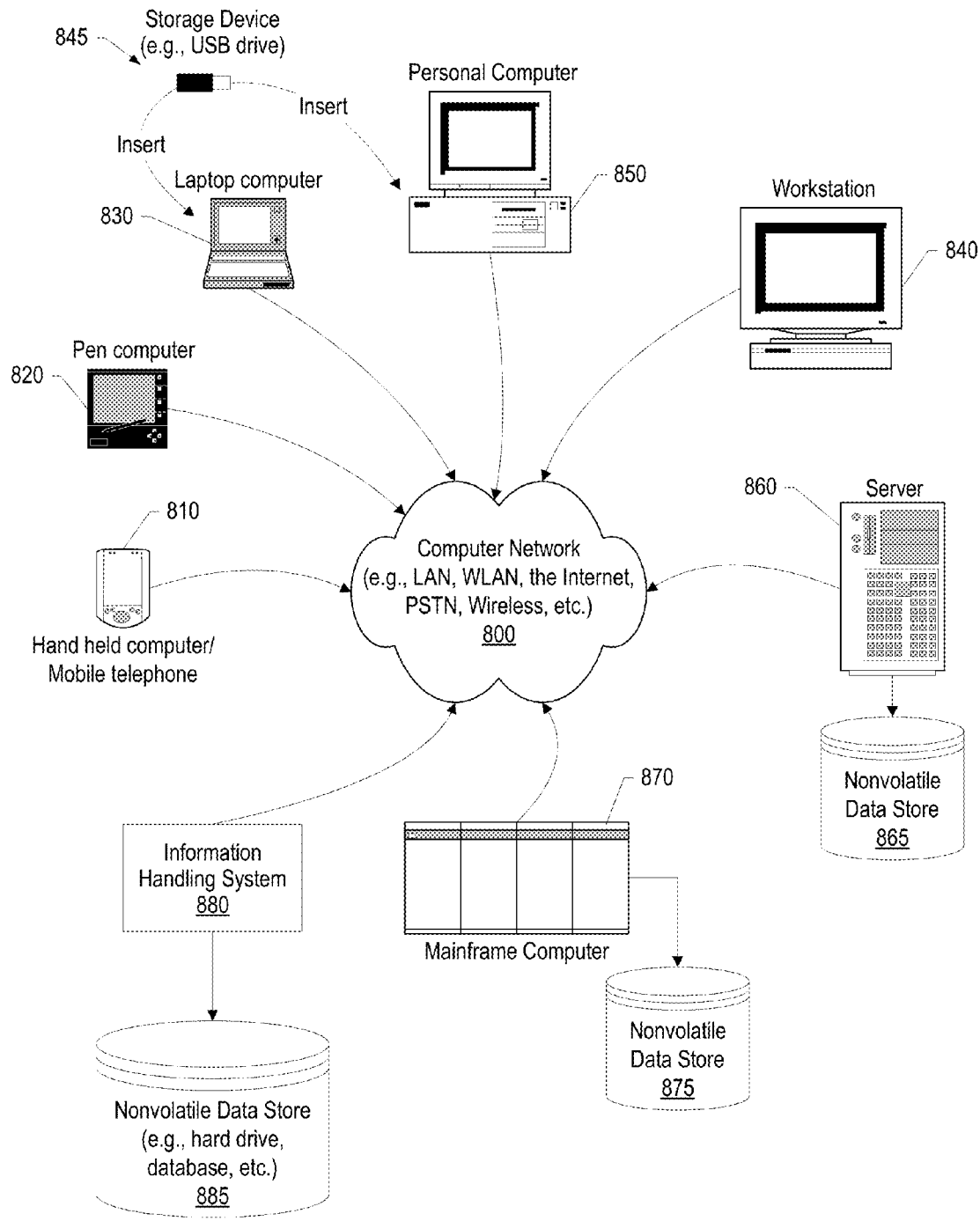
FIG. 8 provides an extension of the information handling system environment shown in FIG. 7 to illustrate that the methods described herein can be performed on a wide variety of information handling systems which operate in a networked environment.

FIG. 8 provides an extension of the information handling system environment shown in FIG. 7 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or notebook, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 745 can be shared among two or more information handling systems using various techniques, such as connecting the removable nonvolatile storage device 745 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
creating an emergency mapping table that comprises a plurality of mapping entries that map each of a plurality of environmental sensors to one or more of a plurality of electrical source connections, wherein the creating further comprises:
 selecting a first emergency type and evaluating each of the plurality of environmental sensors to identify a first set of the plurality of environmental sensors that correspond to the first emergency type;
 adding a first set of the plurality of mapping entries to the emergency mapping table that maps each of the first set of environmental sensors to a first set of electrical source connections;
 selecting a second emergency type and evaluating each of the plurality of environmental sensors to identify a second set of the plurality of environmental sensors that correspond to the second emergency type; and
 adding a second set of the plurality of mapping entries to the emergency mapping table that maps each of the second set of environmental sensors to a second set of electrical source connections;
receiving, at an emergency electrical distribution system, an environmental alert invoked by a triggered one of the plurality of environmental sensors;
analyzing the emergency mapping table and selecting one of the plurality of mapping entries corresponding to the triggered environmental sensor;
identifying the set of electrical source connections in the selected mapping entry, wherein the identified set of electrical source connections is selected from the group consisting of the first set of electrical source connections and the second set of electrical source connections; and
automatically terminating electrical power to the identified set of electrical source connections.

2. The method of claim 1 wherein the emergency electrical distribution system is coupled to an environmental sensor subsystem and an electrical distribution subsystem, the method further comprising:
sending a message to the electrical distribution subsystem to terminate the electrical power to the identified set of electrical source connections.

3. The method of claim 1 wherein each of the plurality of electrical source connections are selected from the group consisting of an electrical outlet, a lighting outlet, and a direct wire electrical device connection.

4. The method of claim 1 wherein each of the plurality of environmental sensors corresponds to a first one of a plurality of rooms included in a building structure, and wherein at least one of the identified set of electrical source connections is located in a second one of the plurality of rooms that is different than the first room.

5. An information handling system comprising:
one or more processors;
a memory coupled to at least one of the processors;
a set of computer program instructions stored in the memory and executed by at least one of the one or more processors in order to perform actions of:
 creating an emergency mapping table that comprises a plurality of mapping entries that map each of a plurality of environmental sensors to one or more of a plurality of electrical source connections, wherein the creating further comprises:
selecting a first emergency type and evaluating each of the plurality of environmental sensors to identify a first set of the plurality of environmental sensors that correspond to the first emergency type;
adding a first set of the plurality of mapping entries to the emergency mapping table that maps each of the first set of environmental sensors to a first set of electrical source connections;
selecting a second emergency type and evaluating each of the plurality of environmental sensors to identify a second set of the plurality of environmental sensors that correspond to the second emergency type; and
adding a second set of the plurality of mapping entries to the emergency mapping table that maps each of the second set of environmental sensors to a second set of electrical source connections;
receiving, at an emergency electrical distribution system, an environmental alert invoked by a triggered one of the plurality of environmental sensors;
analyzing the emergency mapping table and selecting one of the plurality of mapping entries corresponding to the triggered environmental sensor;
identifying the set of electrical source connections in the selected mapping entry, wherein the identified set of electrical source connections is selected from the group consisting of the first set of electrical source connections and the second set of electrical source connections; and
automatically terminating electrical power to the identified set of electrical source connections.

6. The information handling system of claim 5 wherein the information handling system is coupled to an environmental sensor subsystem and an electrical distribution subsystem, the method further comprising:
sending a message to the electrical distribution subsystem to terminate the electrical power to the identified set of electrical source connections.

7. The information handling system of claim 5 wherein each of the plurality of electrical source connections are selected from the group consisting of an electrical outlet, a lighting outlet, and a direct wire electrical device connection.

8. The information handling system of claim 5 wherein each of the plurality of environmental sensors corresponds to a first one of a plurality of rooms included in a building structure, and wherein at least one of the identified set of electrical source connections is located in a second one of the plurality of rooms that is different than the first room.

9. A computer program product stored in a non-transitory computer readable storage medium, comprising computer program code that, when executed by an information handling system, causes the information handling system to perform actions comprising:
creating an emergency mapping table that comprises a plurality of mapping entries that map each of a plurality of environmental sensors to one or more of a plurality of electrical source connections, wherein the creating further comprises:
selecting a first emergency type and evaluating each of the plurality of environmental sensors to identify a first set of the plurality of environmental sensors that correspond to the first emergency type;
adding a first set of the plurality of mapping entries to the emergency mapping table that maps each of the first set of environmental sensors to a first set of electrical source connections;
selecting a second emergency type and evaluating each of the plurality of environmental sensors to identify a second set of the plurality of environmental sensors that correspond to the second emergency type; and
adding a second set of the plurality of mapping entries to the emergency mapping table that maps each of the second set of environmental sensors to a second set of electrical source connections;
receiving, at an emergency electrical distribution system, an environmental alert invoked by a triggered one of the plurality of environmental sensors;
analyzing the emergency mapping table and selecting one of the plurality of mapping entries corresponding to the triggered environmental sensor;
identifying the set of electrical source connections in the selected mapping entry, wherein the identified set of electrical source connections is selected from the group consisting of the first set of electrical source connections and the second set of electrical source connections; and
automatically terminating electrical power to the identified set of electrical source connections.

10. The computer program product of claim 9 wherein the information handling system is coupled to an environmental sensor subsystem and an electrical distribution subsystem, and wherein the information handling system performs further actions comprising:
sending a message to the electrical distribution subsystem to terminate the electrical power to the identified set of electrical source connections.

11. The computer program product of claim 9 wherein each of the plurality of electrical source connections are selected from the group consisting of an electrical outlet, a lighting outlet, and a direct wire electrical device connection.

* * * * *